United States Patent [19]

Janssen

[11] 4,215,629
[45] Aug. 5, 1980

[54] COOKING UTENSILS

[76] Inventor: Alexander P. Janssen, 28 Old Farm Rd., Bellair Charlottesville, Va. 22903

[21] Appl. No.: 649,680

[22] Filed: Jan. 16, 1976

Related U.S. Application Data

[63] Continuation-in-part of Ser. No. 327,658, Jan. 29, 1973, Pat. No. 3,946,654.

[51] Int. Cl.² ............................................. A47J 27/10
[52] U.S. Cl. .................................... 99/403; 99/407; 99/410
[58] Field of Search .............. 99/403, 407, 279, 410, 99/295, 330, 336, 345, 355, 359, 416–417, 418, 449, 467; 126/39 M, 373; 426/412, 39.2, 397, 403; 220/63, 65

[56] References Cited

U.S. PATENT DOCUMENTS

| | | | |
|---|---|---|---|
| 1,428,388 | 9/1922 | Miller | 99/403 |
| 1,566,874 | 12/1925 | Jackson | 99/403 |
| 2,323,623 | 7/1943 | Porter et al. | 99/403 |
| 2,393,420 | 1/1946 | Scheuplein | 99/403 |
| 2,614,484 | 10/1952 | Caruso | 99/403 |
| 2,626,560 | 1/1953 | Burkhardt | 99/410 X |
| 2,667,117 | 1/1954 | Millard et al. | 99/418 |
| 2,728,670 | 12/1955 | Young et al. | 99/295 UX |
| 2,939,606 | 6/1966 | Durbin | 126/39 M X |
| 3,307,955 | 3/1967 | Pirtle | 99/449 X |
| 3,769,028 | 10/1973 | Katz et al. | 426/412 X |
| 3,779,231 | 12/1973 | Anderson | 126/373 |
| 3,946,654 | 3/1976 | Janssen | 99/403 |

FOREIGN PATENT DOCUMENTS 411230  6/1934  United Kingdom ............... 99/415

Primary Examiner—Harvey C. Hornsby
Attorney, Agent, or Firm—Le Blanc, Nolan, Shur & Nies

[57] ABSTRACT

Cooking utensils for both stovetop and oven cookery. They are primarily intended to be used in conjunction with a disposable bag to produce cooked comestibles of superior quality and to eliminate the cleaning appurtenant to the use of conventional cooking vessels.

6 Claims, 11 Drawing Figures

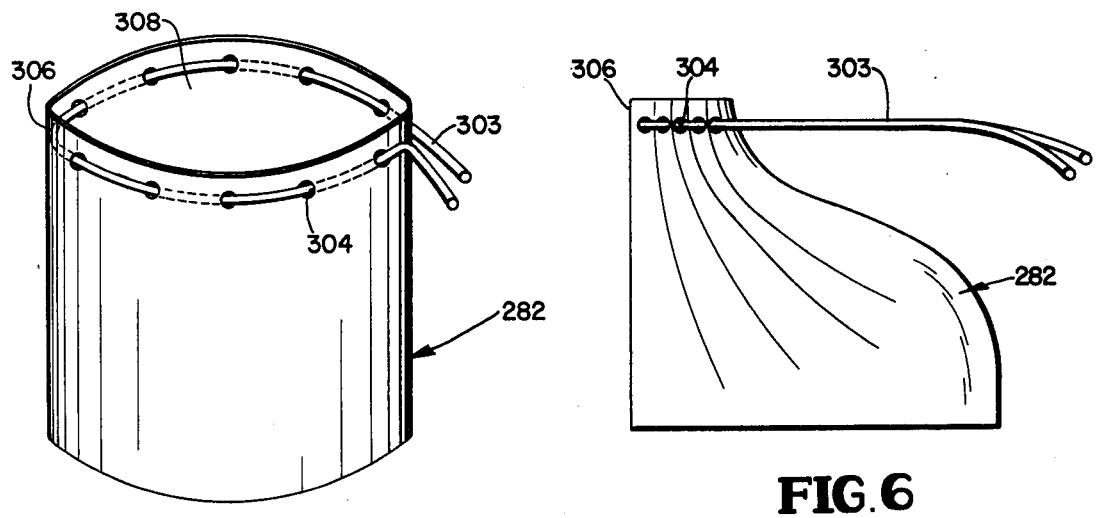
FIG. 7
FIG. 6
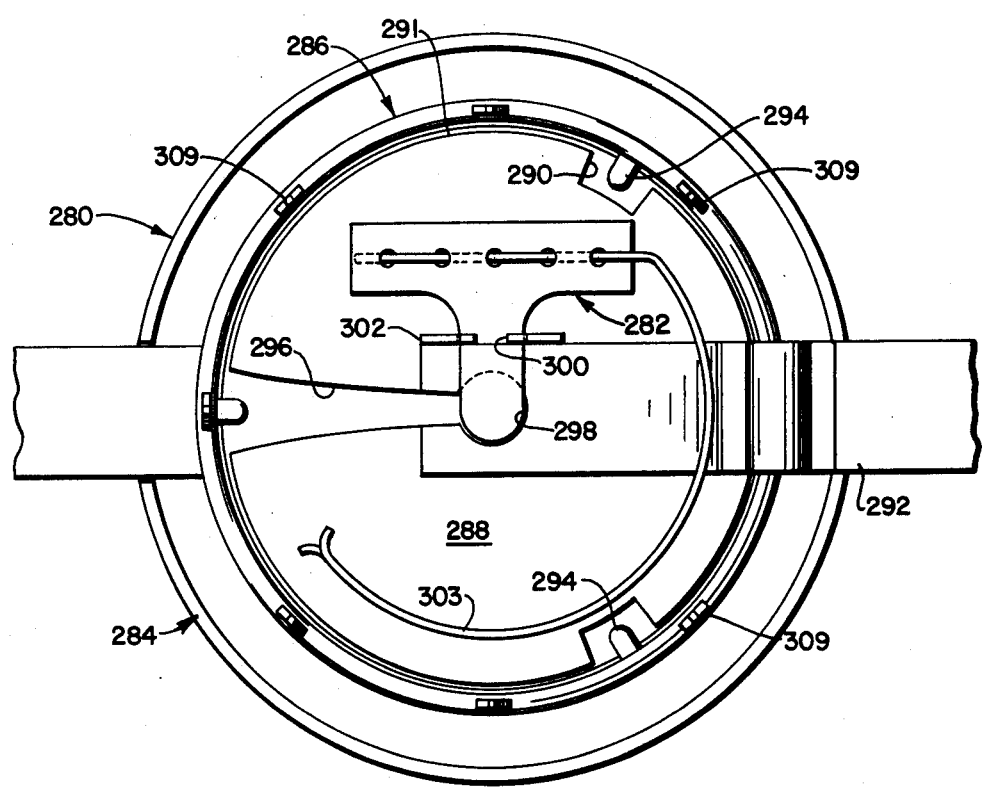
FIG. 5

COOKING UTENSILS

This application is a continuation-in-part of application Ser. No. 327,658 filed Jan. 29, 1973 (now U.S. Pat. No. 3,946,654).

The present invention relates to cooking utensils and, more particularly, to novel, improved cooking utensils for both stovetop and oven cookery.

The novel cooking utensils of the present invention are intended to be used in many, if not most, instances with a disposable bag in which the comestibles are contained during the cooking process.

The term "bag" as employed herein is intended to have a broad meaning and to include sheets of material gathered into a baglike form, etc. as well as those formed containers more conventionally thought of as bags. It is also intended to include bags made available filled with comestibles as well as empty bags which are intended to be filled by the user. Filled bags may be of the sealed type, or their openings may be closed by twist ties or other retainers, for example.

The bag is surrounded by a cooking medium for transferring heat to its contents during the cooking cycle. The cooking medium will typically be water or an oil in the case of stovetop cookery and air for oven cookery.

Cooking in bags of the character just described has a number of important advantages. First, this permits comestibles to be cooked in their own juices. The natural taste of the food is preserved and the loss of nutritional values which occurs when foods are cooked in water is avoided along with the mushy or waterlogged texture which commonly results.

Another virtue is that the utensil is not soiled during the cooking process. Thus, the inconvenience of cleaning the utensil after it is used is eliminated; only rinsing and drying are required.

Furthermore, the bag in which the comestibles are cooked is utilizable to store them. This is a particular convenience if the bag is stored in a refrigerator container or the like as the latter will not become soiled.

To obtain optimum results the cooking vessels I have invented for use with disposable bags are provided with one or more of several novel features not heretofore found in cooking vessels.

One of these is an arrangement for keeping a bag and the comestibles contained in it submersed in the cooking medium when comestibles which would otherwise float are being cooked. This results in heat being conducted uniformly to the comestibles from all directions and, typically, at a higher temperature than it would be if the bag and its contents were allowed to float in the cooking medium. As a consequence, the comestibles are cooked more quickly and more uniformly.

The bag holding arrangement can be constructed so that it will keep the bag and comestibles in place by its own weight. Alternatively, provision may be made for positively or mechanically securing the holddown device in position to achieve this goal.

The bag holding arrangement may also, or instead, be designed to secure the upper, open end of the bag in a manner that will allow gases and vapors evolved from the comestibles to escape while keeping the cooking medium from entering the bag, a configuration sometimes hereinafter referred to as "closed". This permits the bag to collapse against its contents, considerably increasing the efficiency with which heat is transferred to the comestibles; it also maximizes the uniformity with which heat is transferred to the comestibles from different directions. This type of arrangement can of course also be employed in conventional cooking methods to keep the comestibles submersed in the cooking medium. In this style of cookery, also, evenness and quickness of cooking is promoted by the use of such a device.

Typically, a cooking utensil in accord with the present invention will include an outer container for the cooking medium and an inner container for supporting the bag or liner and its contents; and the device described in the preceding paragraph will be constructed to hold the inner container in an elevated position relative to the outer one. This permits the sides and bottom of the bag and its contents to be almost completely surrounded by the cooking medium, maximizing the contact between the medium and the bag and contents.

An inner container facilitates the removal of the cooked comestibles from one area to another. It also permits the cooked comestibles to be kept warm until served without overcooking them as the cooking utensil operates essentially as a double boiler when the inner container is removed to its elevated position. In addition, the inner container facilitates the removal of cooked comestibles from a bag as the cooking medium cannot press the bag or liner against the comestibles.

The inner container can also be furnished with a well for collecting excess fluids generated in the cooking process. This keeps the fluids from contacting and causing unwanted changes in the flavor, texture, or appearance of the comestibles being cooked. Separation of the fluids also facilitates collection of the fluids at the end of the cooking cycle.

It is not essential that an inner container be employed. The inner container can be omitted altogether or replaced by a rack or other component which will permit the cooking medium to circulate under and around the comestibles being cooked and the bag in which they are contained. In other applications the inner container may advantageously be made imperforate like the inner container of a double boiler.

The arrangement for keeping the comestibles submersed in the cooking liquid can be combined with the inner container into a single unit. In any event the inner container will cooperate with the holddown device to promote quickness of cooking.

Another feature which may be incorporated in various embodiments of the present invention is an arrangement for detachably securing the lower corners of the bag to a component of the utensil with the lower end of the bag stretched across the component. This produces two important advantages.

First, this keeps the bag from being buoyed upwardly in a liquid cooking medium and, also, permits the cooking medium to more effectively collapse the bag against the comestibles. The result is that the bag is more uniformly surrounded by the cooking medium, producing more efficient and uniform cooking of the comestibles.

Second, by securing the lower end of the bag to the component, corners are eliminated and a rounded, more open shape is given to the lower end of the bag. This significantly facilitates the removal of comestibles from the bag.

To take maximum advantage of the feature just discussed, I preferably employ a novel bag construction which facilitates the attaching of the bag to the component. At the same time these bags can be economically manufactured so that the added convenience can be economically obtained.

It will also be appreciated that the features described above do not in all cases have to be integral components of a cooking utensil or of an associated bag or liner. Instead they can, for the most part, be provided in accessories usable with conventional cooking vessels to give the latter the advantages possessed by the novel cooking utensils disclosed herein.

Disposable bags for cooking and containers with disposable liners are as such not new as shown by U.S. Pat. Nos. 3,027,261 issued Mar. 27, 1962, to Samara; 3,052,371 issued Sept. 4, 1962, to Van Bemmelen; 3,088,255 issued May 7, 1963, to Griem; 3,117,875 issued Jan. 14, 1964, to Burns; 3,227,305 issued Jan. 4, 1966, to Enssle; and 3,590,888 issued July 6, 1971, to Coleman; British Patent Specification No. 965,498 published July 29, 1964; and the Drackett Products Co. pamphlet entitled "How to Use Cooking Magic Bags" copyrighted in 1971. However, a comparison of the foregoing description of applicant's invention with the various devices described in these documents will make it apparent that the latter are structurally unlike applicant's cooking utensils and disposable bags and that they are not capable of producing the results for which applicant's inventions were expressly designed.

From the foregoing, it will be apparent that the primary object of the present invention resides in the provision of novel, improved cooking utensils and disposable cooking bags.

Other important but more specific objects of the invention are the provision of novel cooking utensils usable in conjunction with disposable bags to cook comestibles:

(1) in a manner which will preserve the nutritional values of the comestibles;

(2) in a manner which will keep them from acquiring a mushy or waterlogged texture;

(3) in a manner which will preserve their flavor;

(4) conveniently and without the soiling of cooking vessels;

(5) in a manner which makes them convenient to store without soiling a storage container;

(6) in a manner providing various combinations of the foregoing advantages.

Still other important but more specific objects of the invention reside in the provision of novel cooking utensils:

(7) in which heat is transferred evenly from all directions to the comestibles being cooked;

(8) in which comestibles cook quickly;

(9) which, in conjunction with the two preceding objects, are designed to be used with a disposable, comestibles-containing bag and are constructed to keep the cooking medium from entering the bag during cooking while permitting gases and vapors to escape so that the bag can collapse against its contents to insure a uniform and efficient transfer of heat to the contents;

(10) which are intended to be used in conjunction with a disposable, comestibles-containing bag and which make provision for ready access to the interior of the bag;

(11) which include a container for the cooking medium, a comestibles-supporting component disposable in the container, and an arrangement for holding the supporting component in an elevated position relative to the container to facilitate access to the supporting component;

(12) which include an arrangement for opening and/or holding open the upper end of a comestibles-containing bag;

(13) in which provision is made for circulating a cooking medium into contact with at least most of the periphery of a disposable bag in which the comestibles to be cooked are contained;

(14) which furnish ready access to the comestibles being cooked;

(15) which have various combinations of the novel features and advantages identified above.

Still another object of the invention resides in the incorporation of certain of the mechanical features identified above into accessories which can be used in conjunction with conventional cooking vessels to obtain various ones of the advantages previously described.

Other important objects and advantages and further novel features of the present invention will become apparent from the appended claims and as the ensuing detailed description and discussion proceeds in conjunction with the accompanying drawing, in which:

FIG. 1 is a vertical section through a cooking utensil constructed in accord with the principles of the present invention which also shows an arrangement for keeping the mouth of a bag closed while comestibles contained in it are being cooked;

FIG. 2 is a vertical section through a second form of cooking utensil in accord with the principles of the present invention which has an arrangement for keeping a comestibles-containing bag submersed in a cooking medium and a separate arrangement for supporting an inner container of the utensil in an elevated position to facilitate access to the interior of the bag; the section is taken substantially along lines 2—2 of FIG. 3;

FIG. 5 is a plan view of a sixth form of cooking utensil in accord with the principles of the present invention;

FIG. 6 is an elevation of a disposable cooking bag designed for use with cooking utensils of the type disclosed herein, the mouth of the bag being closed;

FIG. 7 is a view of the bag with its mouth open;

Figure 1:
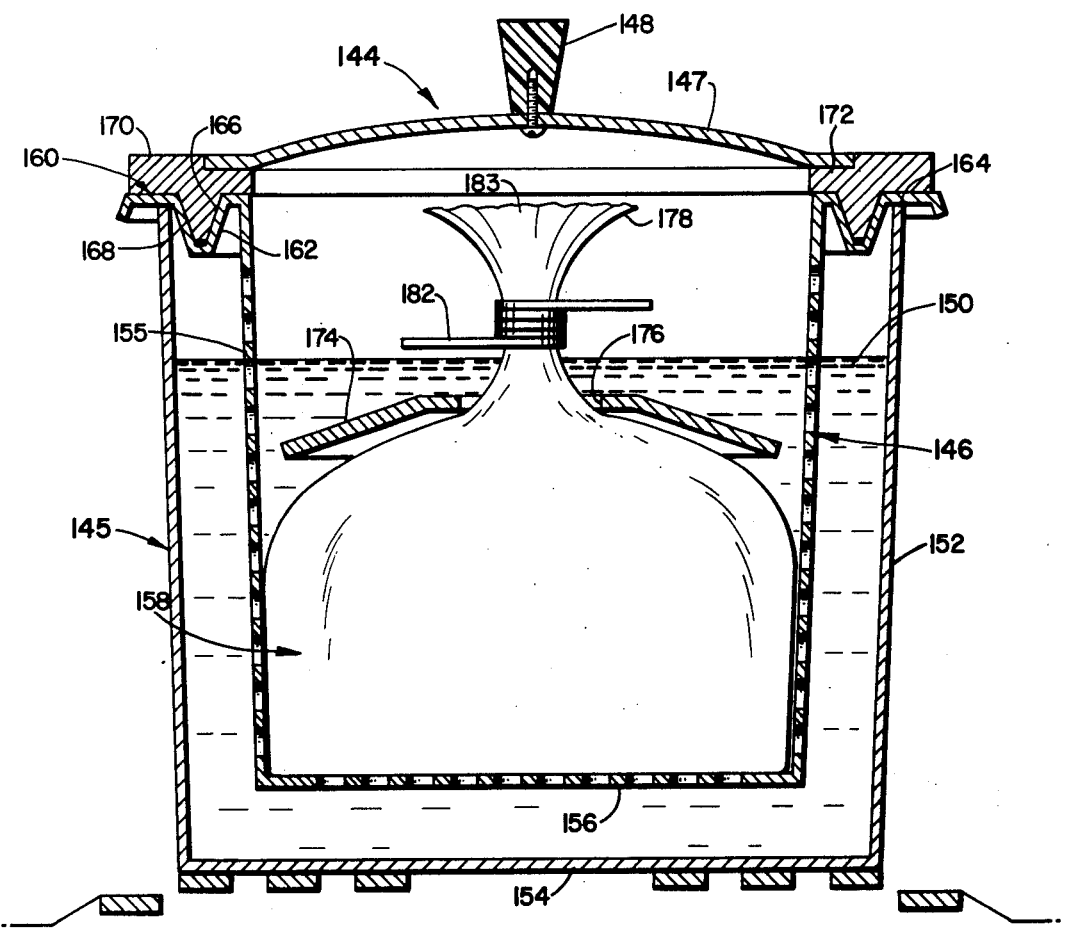

Referring now to the drawing, FIG. 1 depicts a cooking vessel 144 constructed in accord with the present invention. This cooking utensil is useful for both oven and stovetop cookery.

Cooking utensil 144 includes an outer container or pan 145, an inner, bag-holding rack or support 146, and a lid 147 with a handle 148.

The outer component 145 of the cooking utensil, which is designed to hold a cooking medium 150, has a vertically extending side wall 152 and a bottom wall 154 like those of conventional pans. It will also typically have one or more handles (not shown) to facilitate handling.

Bag-holding support 146 has a vertically extending, perforate side wall 155 and a perforate bottom wall 156. This permits the cooking medium to circulate freely around and into contact with a disposable bag 158 supported in the rack.

A generally horizontal, outwardly extending flange 160 is formed at the upper end of rack side wall 155. Intermediate its inner and outer edges, a downwardly extending, generally V-shaped projection 162 is formed in flange 160.

Flange 160 rests on the upper edge 164 of outer container side wall 152. This keeps the bottom wall 156 of the rack in spaced relation to the bottom wall 154 of the outer container. Projection 162 keeps the side wall 155 of the rack in spaced relation to outer container side wall 152.

Projection 162 also provides an upwardly opening recess 166 in which a correspondingly configured, depending projection 168 on a ringlike retainer 170 is seated. A recess 172 in the retainer furnishes a seat for lid 147 of the cooking utensil.

Cooking utensil 144 will also typically include a component 174 for keeping the comestibles-filled bag 158 submersed in the cooking medium. This component has a concavo-convex configuration and will typically be made of metal so that it will be heavy enough to keep bag 158 and its contents from floating.

An aperture 176 in component 174 allows the upper, open end 178 of the bag to extend upwardly through the holddown component.

In the cooking arrangement shown in FIG. 1, a tie 182 is employed to narrow the opening 183 in the bag during the cooking cycle. Such ties are conventional and typically consist of a readily deformable, wirelike core surrounded by a cellulosic or other covering. The bag may be one previously filled and provided with a twist tie to secure the contents in place; or the bag may be filled and the twist tie added later—at the time the comestibles are to be cooked or at an earlier time.

Provision is also made in cooking utensil 144 for holding the upper end 178 of bag 158 open, when desired. This is accomplished by removing lid 147, retaining ring 170, and tie 182. The upper end 178 of the bag is then spread and folded across the flange 160 at the upper end of rack side wall 155. The retaining ring 170 is then replaced, clamping the upper end of the bag in recess 166 to keep it in place.

It will also be apparent that utensil 144 can be used without modification to cook comestibles made available in sealed bags and pouches as are a number of frozen foods. Holddown device 174 will in this case, also, keep the bag and contents submerged by its own weight, allowing the comestibles to cook faster and/or more uniformly in many cases.

Figure 2:
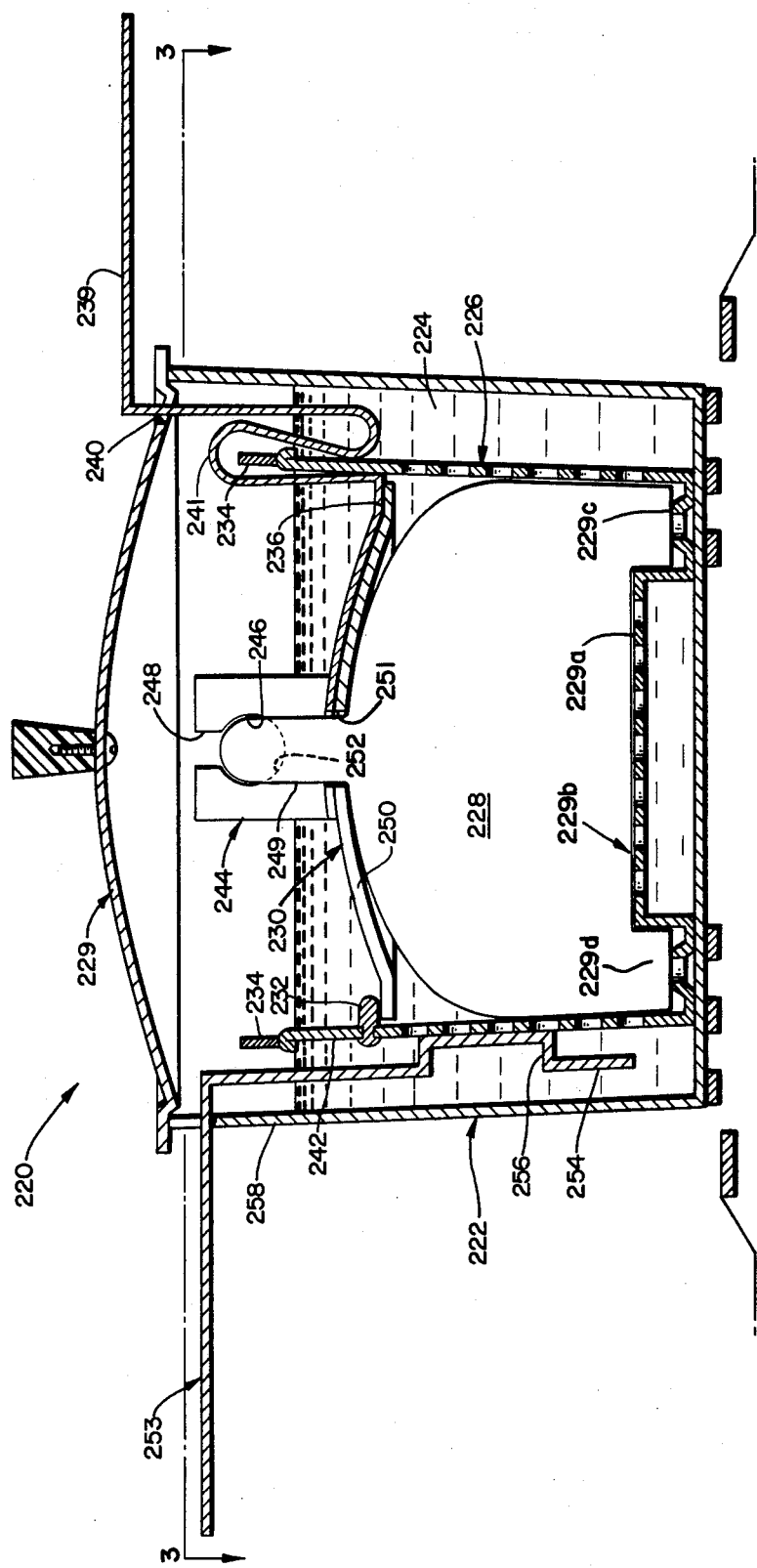
Figure 3:
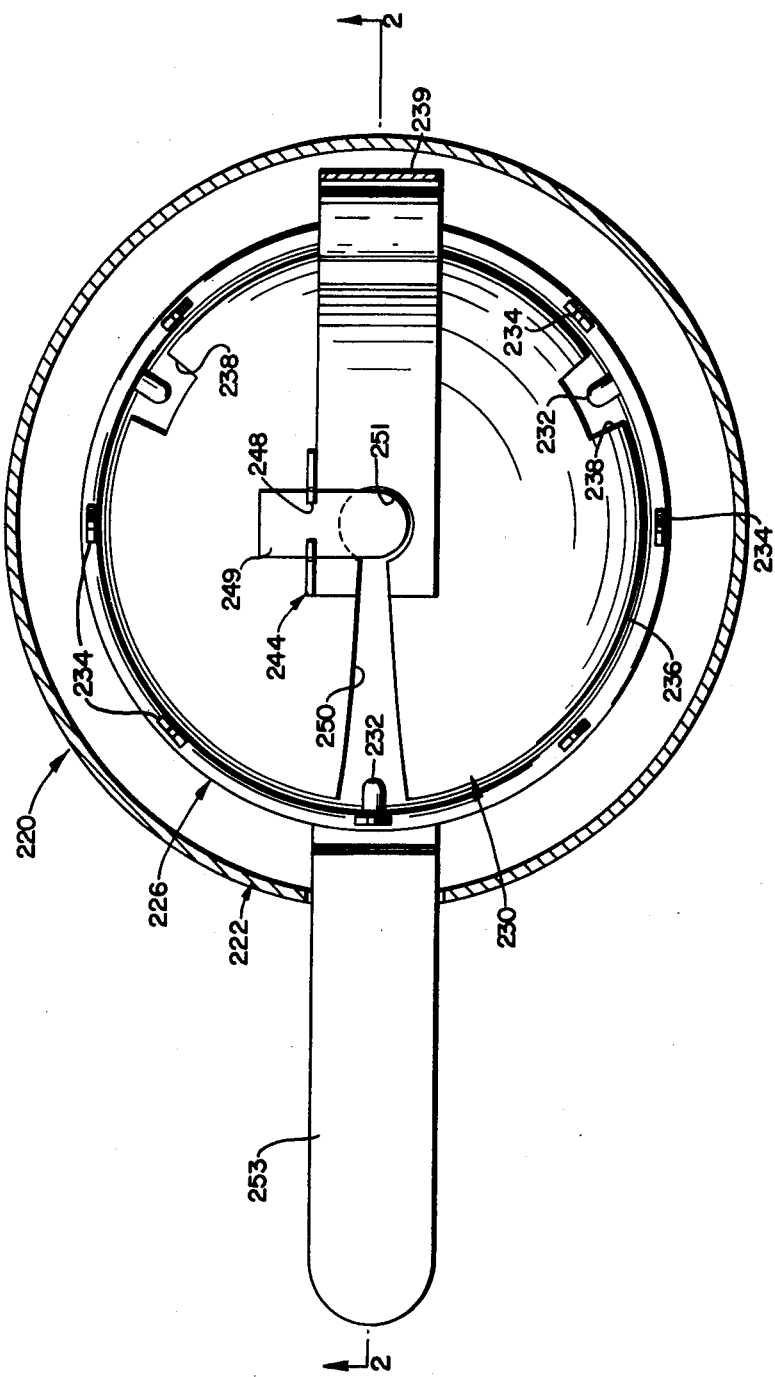
FIG. 3 is a horizontal section through the cooking utensil of FIG. 2, taken substantially along lines 3—3 of the latter Figure.
Figure 4:
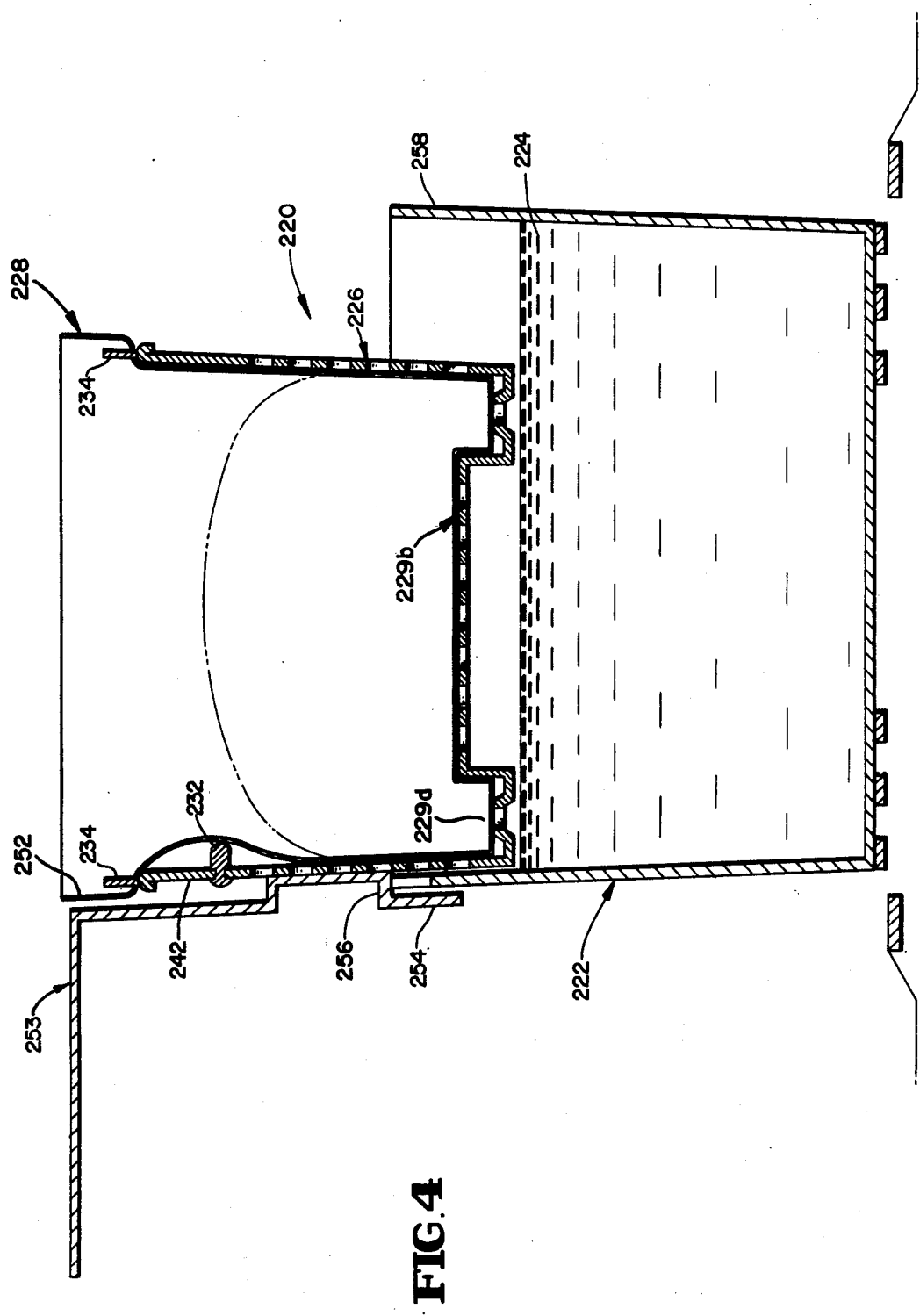
FIG. 4 is a view similar to FIG. 2, but with the inner container in its elevated position and the cooking bag open.

Returning again to the drawing, FIGS. 2, 3, and 4 are devoted to a cooking utensil 220. This utensil includes an outer container or pan 222 for a cooking medium 224, an inner rack or bag-holding device 226 in which a comestibles-containing bag 228 can be disposed, and a lid or cover 229.

For the most part rack 226 is like the rack 146 of the utensil shown in FIG. 1.

The major, central portion 229a of rack bottom wall 229b, however, is elevated with respect to its peripheral portion 229c. The peripheral portion of disposable bag 228 depends into the recess formed by the just-described configuration of bottom wall 229b to form a well 229d. Liquids evolved during the cooking cycle collect in the well. This keeps excess liquids out of contact with the comestibles during the cooking cycle and facilitates the removal of the comestibles apart from the liquids at the end of the cooking process.

The mechanism employed to keep bag 228 and its contents from floating during the cooking cycle and to close and open the bag includes a coverlike holddown device 230, cooperating stops 232, and tabs or prongs 234.

Referring now in particular to FIGS. 2 and 3, the holddown device is a concavo-convex member with a generally horizontal flange 236 in which notches 238 are formed. The holddown device also includes a handle 239 which extends to the exterior of the cooking utensil through a notch 240 in lid 229. A spring clip 241 in the handle detachably fixes the holddown device to rack 226 so that it will not be floated upwardly by comestibles being cooked.

Stops 232 are fixed in any convenient manner to the side wall 242 of rack 226 and extend inwardly therefrom. As shown in FIG. 3, holddown device 230 can be manipulated by handle 239 to align notches 238 with stops 232. The holddown device is then lowered and rotated until unnotched portions of flange 236 lie beneath the stops as shown in FIG. 2. This locks the holddown device in the illustrated position, making it capable of keeping bag 228 and its contents submersed as shown in the same figure.

Fixed to and extending upwardly from holddown device 230 is a bracket 244. Formed in the bracket is an aperture 246 communicating with the upper edge of the bracket via a slot 248.

The upper portion 249 of bag 228 is gathered to narrow its opening by drawing it through a slot 250 in holddown device 230 into aperture 251 therein and then displacing this portion of the bag through the slot 248 in bracket 244 into aperture 246.

The bag is held open to facilitate access to its interior by withdrawing its upper end 249 from bracket 244, removing cover 229 and holddown member 230, and impaling the upper portion 249 of the bag on prongs 234 to spread opening 252. The prongs will typically have a triangular configuration.

FIG. 4 shows bag 228 with its upper end 249 thus immobilized to facilitate access to its interior through opening 252.

The bag-supporting component 226 of cooking utensil 220 is also preferably provided with a handle 253. FIG. 4 shows the cooking utensil with a guide 254 and ledge 256 formed in handle 253 engaged with the upper edge of outer container side wall 258. Thus, the outer container supports the bag-holding rack 226 in an elevated position relative to the outer container above the cooking medium 224 in the latter. This facilitates the loading of a bag or bag and contents in the supporting component and the removal of the same therefrom.

Referring again to the drawing, FIG. 5 depicts a cooking utensil 280 similar to the utensil 220 just described, but designed to be employed in conjunction with a different type of disposable bag 282. The bag is shown in profile in FIG. 6 and pictorially in FIG. 7.

Cooking utensil 280 includes an outer container or pan 284, an inner component or rack 286, and a holddown device 288. Components 284 and 286 may be of generally the same construction as the corresponding components in those embodiments of the invention described previously as may holddown device 288. Notches 290 are formed in the manner described previously in a flange 291 extending from the holddown device. These permit the latter to be rotated by its handle 292 to align the notches with stops 294 fixed to and extending inwardly from rack 286. The holddown device is then lowered and rotated to lock it in place in pan 284. As in the other embodiments of the invention with holddown devices, this keeps bag 282 and its contents submersed in the cooking medium contained in pan 284.

An elongated slot 296 terminating in a circular aperture 298 is formed in the holddown device. A second slot 300 is formed in an upstanding bracket 302 attached to and forming a part of the holddown device.

Referring now to FIGS. 6 and 7, a drawstring member 303, typically formed of wire or a similar, relatively stiff material, is threaded through apertures 304 in the upper portion 306 of the bag, which terminates in an opening 308. The upper end 306 of the bag can be collapsed by member 303 to constrict opening 308 as shown in FIG. 6 or spread apart on this member to enlarge the size of the opening as shown in FIG. 7.

As shown in FIG. 5, the upper end 306 of bag 282 is kept uppermost during the cooking cycle by sliding this portion of the bag through slot 296 into aperture 298 and then folding it laterally and pushing it down through slot 300. When access to the interior of the bag is wanted, the sequence is reversed.

Referring still to FIG. 5, the inner component 286 of the cooking utensil may also be provided with prongs 309 such as those employed in the cooking utensil 220 of FIG. 2, if desired. These increase the versatility of cooking utensil 280 by permitting it to be used with conventional bags in addition to those of the character illustrated in FIGS. 6 and 7.

Bags with drawstrings for closing their open ends can of course be used with other cooking utensils employing the principles of the present invention. For example, a drawstring can be substituted for a twist tie used as shown in FIG. 1.

As indicated above, cooking utensils in accord with the principles of the present invention need not necessarily have an inner rack or container. One such utensil is shown in FIGS. 8–10 and identified by reference character 310.

Utensil 310 includes a container or pan 312 with side walls 314 and a bottom wall 316; a device 318 for keeping a comestibles-filled bag 320 submersed in a body of cooking liquid 322 in the pan; and a conventional cover or lid 324 with a handle 326.

Holddown device 318 includes a concavo-convex member 328 with an annular flange 330, a cylindrical support member 332 notched at intervals to form feet 334, and an upstanding bracket 336 to which the upper portion 338 of the bag can be affixed.

Figure 9:
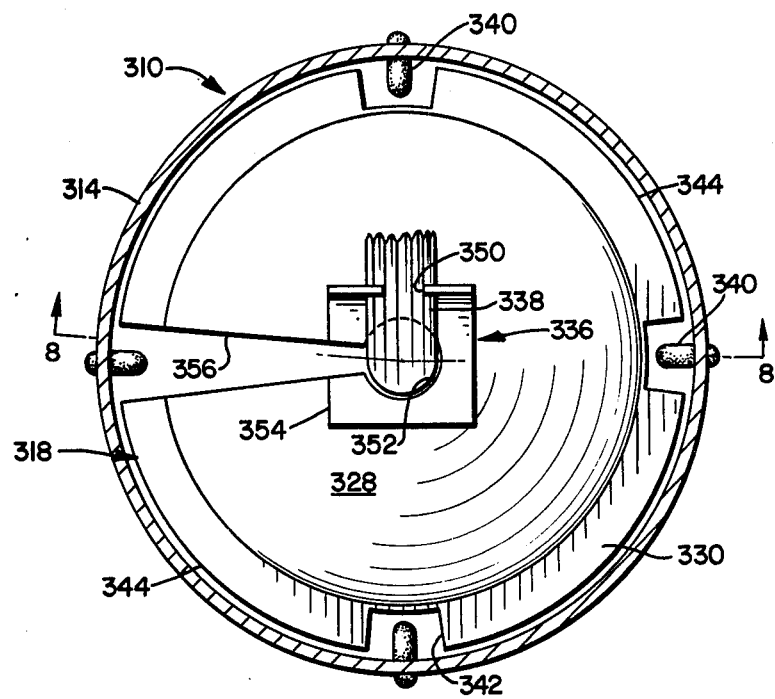
FIG. 9 is a horizontal section through the utensil taken substantially along line 9—9 of FIG. 8.
Figure 8:
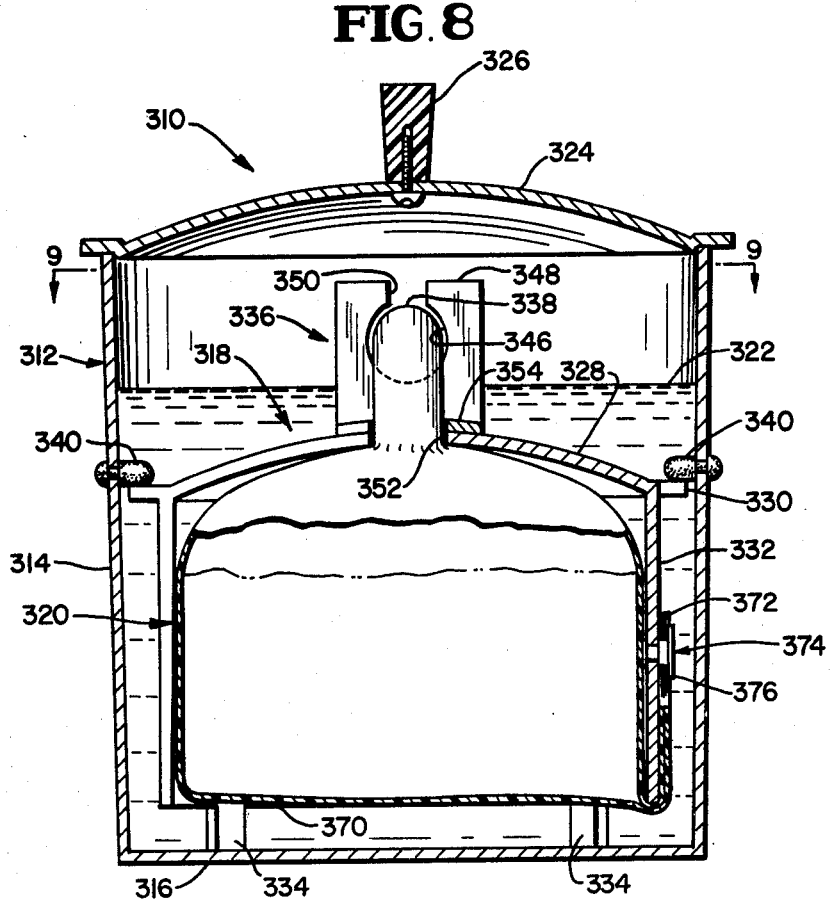
FIG. 8 is a vertical section through yet another cooking utensil in accord with the principles of the present invention.
Figure 10:
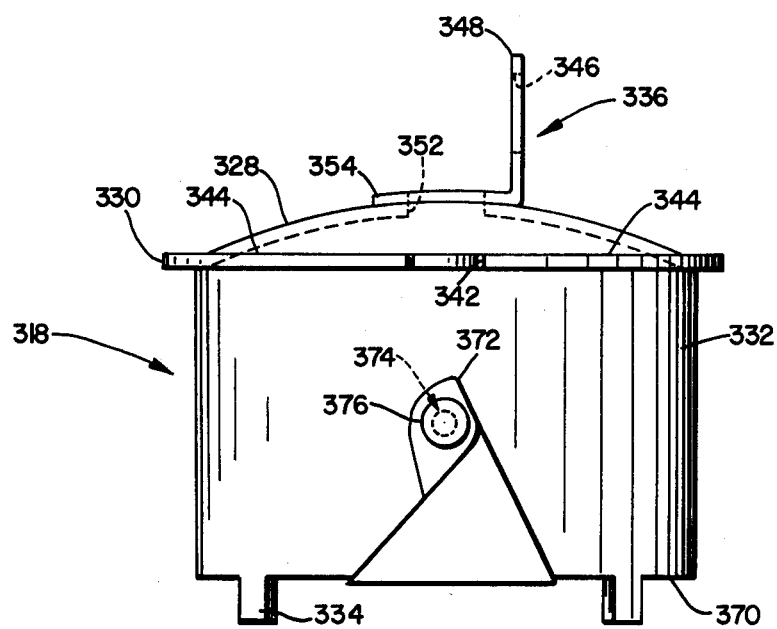
FIG. 10 is an elevation of a holddown device incorporated in the utensil of FIGS. 8 and 9.

As shown in FIGS. 8 and 9, stops 340 are fixed to the side wall 314 of pan 312 and extend inwardly from the pan at intervals therearound. These stops keep holddown device 318 and comestibles-filled bag 320 from floating upwardly in cooking medium 322.

Specifically, after the comestibles-filled bag has been loaded into pan 312, holddown device 318 is lowered over it with notches 342 in flange 330 aligned with stops 340 so that the flange can pass to a level below the stops. The holddown device is then rotated until unnotched portions 344 of the flange lie beneath and are therefore engageable by the stops which accordingly keep the holddown device and the bag 320 beneath its concavo-convex portion 328 from rising.

Referring now to FIGS. 8-10, an aperture 346 is formed in the vertical leg 348 of holddown device bracket 336. This aperture communicates with the upper edge of leg 348 via a slot 350.

A similar aperture 352 is formed through the central part of concavo-convex member 328 of the holddown device and through the horizontal leg 354 of bracket 336. This aperture communicates with the edge of member 328 via a slot 356.

The upper part 338 of bag 320 is drawn through slot 356 into aperture 352 and through slot 350 into aperture 346. This keeps the open end of the bag uppermost in container 312 and out of the cooking medium while the comestibles are cooked.

Also, the opening into the bag is narrowed by disposing it in apertures 346 and 352. If desired, the opening can be further narrowed as by a twist tie or other retainer or by a drawstring, for example.

Provision is also made in cooking utensil 310 for stretching the lower end of the disposable cooking bag 320 across the lower end of holddown support member 332 and then securing the lower corners of the bag to member 332 to keep it taut. As discussed previously, this eliminates the corners, facilitating the removal of comestibles from bag 320. Also, the lower end of the bag and its contents are kept from floating upwardly, promoting rapid and uniform cooking of the comestibles.

Figure 11:
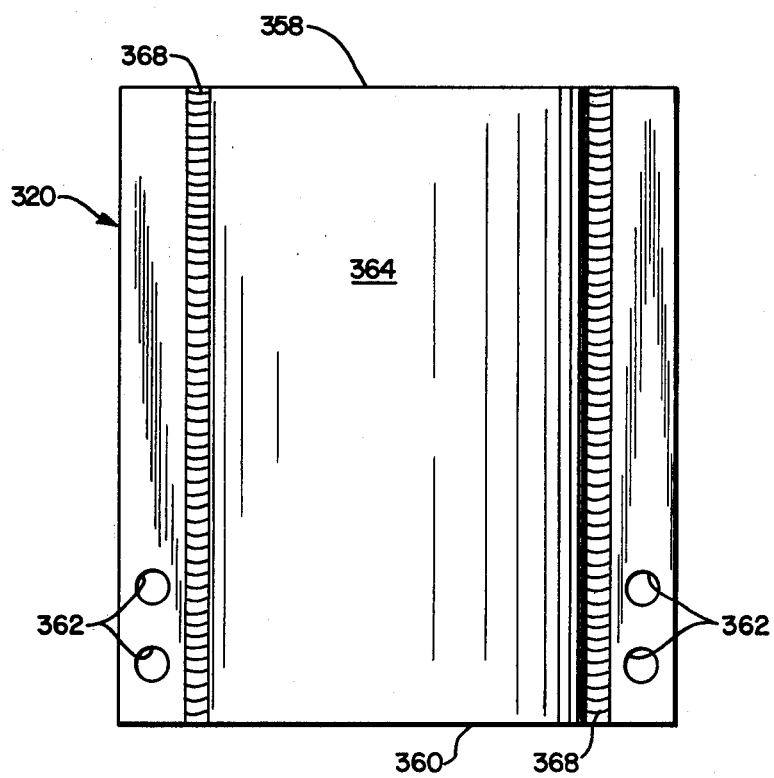
FIG. 11 is an elevation of a disposable bag especially intended for use with a cooking utensil of the character shown in FIGS. 8–10.

As shown in FIG. 11, bag 320 has a rectangular configuration with an open upper end 358 and a closed lower end 360. Holes or apertures 362 are formed through the bag adjacent its lower end and adjacent the two edges of the bag. Inwardly of these apertures, the two sides 364 of the bag (only one of which is shown) are sealed together by seams 368 to prevent leakage.

Bag 320 is secured to the support member 332 of holddown device 318 by stretching its closed end across the lower edge 370 of support member 332 and then hooking the lower corners 372 of the bag over outwardly projecting studs 374 fixed to support member 332, the studs extending through holes 362 in the bag. Two diametrically opposed studs 374 are employed, one for each of the two corners 372 of the bag.

Studs 374 preferably have enlarged heads 376 over which the bag is stretched. The bag then relaxes to its original configuration so that the enlarged heads of the studs keep the corners of the bag in place.

Also, the pan 312 of cooking utensil 310 may be provided with prongs as described above to hold the upper part of the bag open and facilitate access to its contents.

Furthermore, the utensil can be readily given the capability of being used with conventional bags by providing retainers for keeping the lower corners of the bag in place on studs 374. Suitable for this purpose are the spring-type retainers described in parent application Ser. No. 637,966 (now U.S. Pat. No. 4,005,645 issued Feb. 1, 1977).

It will be appreciated by those skilled in the relevant arts that a component such as shown in FIG. 10 may be made heavy enough to keep a comestibles-filled bag submersed by its own weight, making the positive lockdown arrangement unnecessary. In this case the component may be furnished as an accessory and used with a conventional pot or pan in the manner described above. Other of the holddown devices described above may similarly be furnished as accessories rather than components of a special utensil.

As discussed above, it is contemplated that utensils embodying the principles of the present invention will be used to cook comestibles made available in packaged form, either in sealed bags or bags with an opening closed by a twist tie or other retainer. Such applications of my invention are fully intended to be covered in the appended claims.

Also, I have illustrated in the drawing and described above a variety of cooking utensils and accessories constructed in accord with the principles of the present invention. And I have also pointed out that cooking utensils adhering to the principles of the present invention will not necessarily resemble these to any great extent. The present embodiments are, therefore, to be considered in all respects as illustrative and not restrictive, the scope of the invention being indicated by the appended claims rather than by the foregoing description; and all changes which come within the meaning and range of equivalents of the claims are therefore intended to be embraced therein.

What is claimed and desired to be secured by Letters Patent is:

1. The combination of a cooking utensil for comestibles and a disposable bag for holding the comestibles to be cooked, said utensil comprising a container and means engageable with the comestibles-filled bag to hold said bag in said container and keep it from floating so that said bag can be submersed in a liquid in said container to cook the comestibles in said bag, the means for keeping the comestibles-filled bag from floating including means to which the lower end of the bag can be attached to shape said lower end into a configuration which facilitates the removal of comestibles from said bag and to keep said lower bag end from floating upwardly in the liquid in said container.

2. The combination of claim 1, wherein the means for keeping the bag from floating has a vertically extending wall means and wherein the means to which the lower end of the bag can be attached are studs protruding outwardly from said side wall at diametrically opposed locations therearound.

3. An accessory usable with a container and a disposable bag for holding comestibles to keep the bag submersed in a liquid cooking medium in the container while the comestibles cook, said accessory comprising a cover member adapted to be located above and to be engaged by the comestibles-filled bag, said cover member having an aperature through which the upper end of the bag can be extended to keep said end uppermost during the cooking cycle and thereby prevent upward movement of said bag and its contents and means for supporting the cover member in spaced relation above and from the bottom of the container with which it is used, said cover member supporting means and the cover member being integrated into a single unit and said accessory also having a vertically extending side wall means, the cover member supporting means comprising feet integrated with said side wall means at the lower end thereof and at intervals therearound and the cover being integrated with the side wall means at the upper end thereof.

4. An accessory according to claim 3, which has an outwardly directed flange means around the periphery thereof, there being notches at intervals along said flange, whereby said accessory can be locked against upward movement in a container having a bottom wall and co-operating stops by disposing said accessory in said container with said feet resting on the container bottom wall and the notches aligned with the stops and then rotating said accessory to bring unnotched portions of said flange under said stops.

5. An accessory usable with a container and a disposable bag for holding comestibles to keep the bag submersed in a liquid cooking medium in the container while the comestibles cook, said accessory including means adapted to have the lower end of the bag attached thereto to shape said lower end into a configuration which facilitates the removal of comestibles from said bag and to keep said lower bag end from floating upwardly in the liquid in said container, said accessory having a vertically extending wall means and the means to which the lower end of the bag is adapted to be attached comprising studs protruding outwardly from said side wall at diametrically opposed locations therearound, said studs being adapted to have the lower end of the bag attached thereto.

6. The combination of a cooking utensil for comestibles and a disposable bag for holding the comestibles to be cooked, said bag having an opening therein through which comestibles can be introduced and removed and the said utensil comprising a container and means engageable with the comestibles-filled bag to hold said bag in said container and keep it from floating so that said bag can be submersed in a liquid in said container to cook the comestibles in said bag, the means for holding down the comestibles-filled bag and its contents including means for gathering the portion of the bag in which the opening is formed during the cooking cycle so that gases and vapors can escape through the opening without a cooking medium entering the bag therethrough, the means for gathering the portion of the bag in which the opening is formed being a first member incorporated in the holddown means and having an opening therein in which said portion of the bag can be located to gather it and constrict the opening therein, the opening in said first member of the means for holding down the comestibles-filled bag and its contents being a slot therethrough which extends from the periphery to the central part thereof through which the upper part of the bag can be displaced to position the holding means relative to the bag, said first member being generally horizontally oriented, and the means for holding down the comestibles-filled bag including a second member with an opening therethrough, said second member being vertically oriented and located adjacent the inner end of the slot in the first member, whereby the gathered upper end of the bag can be extended through the opening in said second member to retain it in place.

* * * * *